(12) United States Patent
Caceres et al.

(10) Patent No.: US 9,071,971 B2
(45) Date of Patent: Jun. 30, 2015

(54) ADAPTIVE AND CONTEXT BASED NFC ACCESS CONTROL FILTERING

(71) Applicant: Cellco Partnership, Basking Ridge, NJ (US)

(72) Inventors: Manuel E. Caceres, Basking Ridge, NJ (US); Yuk Lun Li, Morganville, NJ (US); Ashfaq Kamal, Norristown, PA (US); Warren Hojilla Uy, Randolph, NJ (US); Ruben Cuadrat, New York, NY (US)

(73) Assignee: Cellco Partnership, Basking Ridge, NJ (US)

( * ) Notice: Subject to any disclaimer, the term of this patent is extended or adjusted under 35 U.S.C. 154(b) by 65 days.

(21) Appl. No.: 13/949,770

(22) Filed: Jul. 24, 2013

(65) Prior Publication Data

US 2015/0033289 A1    Jan. 29, 2015

(51) Int. Cl.
*H04W 12/08* (2009.01)
*H04B 5/00* (2006.01)

(52) U.S. Cl.
CPC ............. *H04W 12/08* (2013.01); *H04B 5/0031* (2013.01)

(58) Field of Classification Search
CPC . H04W 12/08; H04B 5/0031; H04L 63/0428; H04L 29/06
USPC .......................................................... 726/30
See application file for complete search history.

(56) References Cited

U.S. PATENT DOCUMENTS

| 8,761,665 | B2* | 6/2014 | Lee ............................. 455/41.1 |
| 2009/0157928 | A1* | 6/2009 | Riegebauer ................... 710/110 |
| 2009/0206984 | A1* | 8/2009 | Charrat et al. ................. 340/5.2 |
| 2011/0078549 | A1* | 3/2011 | Thueringer et al. .......... 714/807 |
| 2012/0123883 | A1* | 5/2012 | Charrat ........................... 705/17 |
| 2012/0190332 | A1* | 7/2012 | Charles .......................... 455/410 |
| 2012/0311322 | A1* | 12/2012 | Koyun et al. .................. 713/156 |
| 2013/0059563 | A1* | 3/2013 | Huque et al. .................. 455/410 |
| 2013/0059567 | A1* | 3/2013 | Huque et al. .................. 455/411 |
| 2013/0212407 | A1* | 8/2013 | Walton et al. ................. 713/190 |
| 2013/0217325 | A1* | 8/2013 | Ingels ......................... 455/41.1 |
| 2013/0305333 | A1* | 11/2013 | Katzer et al. ....................... 726/7 |
| 2013/0337770 | A1* | 12/2013 | Huque et al. .................. 455/410 |

OTHER PUBLICATIONS

Teh et al., "NFC smartphone based access control system using information hiding", 2013, pp. 13-17.*
Hancke et al., "A Generic NFC-enabled Measurement System for Remote Monitoring and Control of Client-side Equipment", 2011, pp. 44-49.*

* cited by examiner

*Primary Examiner* — Kambiz Zand
*Assistant Examiner* — Yonas Bayou

(57) ABSTRACT

A mobile device includes a transceiver for performing wireless communication; one or more secure elements which execute applications in a secure environment; a near field communication system for performing wireless communication independent of the transceiver and at a lower amount of power than said transceiver; and a contactless front end included in the near field communications system for receiving a data message from a near field communication device. The contactless front end includes a filter list for evaluating the data message and for controlling whether each data message is transmitted further into the mobile device.

18 Claims, 13 Drawing Sheets

| Code # | Store Name |
|---|---|
| 013467 | Macy's |
| 250316 | Kohl's |
| • | • |
| • | • |
| • | • |
| • | • |
| • | • |
| • | • |
| • | • |
| • | • |
| 971586 | Gertz |

White List

Filter State - based on Screen State

| CLF State | Device Screen | Device Locked? | Filtering State |
|---|---|---|---|
| FULL POWER | ON | NO | OFF |
| FULL POWER | ON | YES | ON |
| FULL POWER | OFF | NO | ON |
| LOW POWER | OFF | NO | ON |
| NO POWER | OFF | NO | ON |

Fig. 5

Filter State - based on GeoLocation

| CLF State | Location | Payments | Building Access |
|---|---|---|---|
| FULL POWER | Home | Yes | YES |
| FULL POWER | WORK | YES | YES |
| FULL POWER | Subway | NO | YES |
| LOW POWER | Macy's | YES | NO |
| NO POWER | N/A | N/A | N/A |

| Code # | Store Name |
|--------|------------|
| 013467 | Macy's |
| 250316 | Kohl's |
| • | • |
| • | • |
| • | • |
| • | • |
| • | • |
| • | • |
| • | • |
| • | • |
| 971586 | Gertz |

White List

FIG. 8

| Code # | Store Name |
|--------|------------|
| 312915 | Jones' |
| 517619 | Smith's |
| • | • |
| • | • |
| • | • |
| • | • |
| • | • |
| • | • |
| • | • |
| • | • |
| 411709 | Ed's Discount |

Black List

ADAPTIVE AND CONTEXT BASED NFC ACCESS CONTROL FILTERING

BACKGROUND

Mobile commerce, using mobile devices such as smart phones, tablets or the like, is rapidly expanding in popularity. Recently, near field communication (NFC) has been deployed in many types of mobile devices; and NFC has been adopted for a variety of applications, including payment applications. The Isis Mobile Wallet™, for example, was recently launched in the US using NFC for mobile payment. Mobile service providers and their mobile device vendors are deploying a secure element (SE) implemented in the Universal Integrated Circuit Card (UICC) or subscriber identity module (SIM) of new mobile devices to support this NFC based transaction service. For mobile payments using NFC, a secure element is required. In the payment mode, NFC card emulation is required along with the secure element.

When a user brings their mobile device within NFC communication range of an NFC enabled payment terminal at a point of sale (POS) (e.g., a bricks-and-mortar store), the terminal sends out a command via a magnetic field to initiate communication with a Contactless Front End (CLF) provided via an NFC controller in the mobile device. The CLF interprets the command and routes the request appropriately. If the request is for mobile payment, the CLF routes the data to the secure element for authentication. Once the authentication requirement is met, secure information from the SE will be released through a secure channel from the SE through the NFC controller back to the POS terminal. The data flows from the POS to the backend server(s), e.g. to process the payment. Currently, the NFC controller will only route payment transactions to the SE. All other transactions are routed to the host processor of the mobile device.

Mobile devices have screens, and the screens can be placed in an off position. Alternatively, the phone can be locked. If the screen is in the off position, or if the phone is locked, then (historically and for security purposes) payment using the mobile device is not allowed. In such a situation, the NFC controller will not route a payment transaction to the SE. To thus pay using ISIS mobile wallet (for example), and in order for the NFC controller to route the payment transaction to the SE, the screen of the mobile device needs to be on and the mobile device needs to be unlocked.

BRIEF DESCRIPTION OF THE DRAWINGS

FIG. 5 illustrates an exemplary filter list which may be used to determine, based on locked state and screen power, whether an application identification should be transmitted to a secure element.

FIG. 6 illustrates an exemplary filter list which may be used to determine, based on location, whether an Application Identification should be transmitted to a secure element.

FIG. 7 illustrates an exemplary white list which may be used as a filter list for determining whether an Application Identification should be transmitted to a secure element.

FIG. 8 illustrates an exemplary black list which may be used as a filter list for determining whether an Application Identification should be prevented from being transmitted to a secure element.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
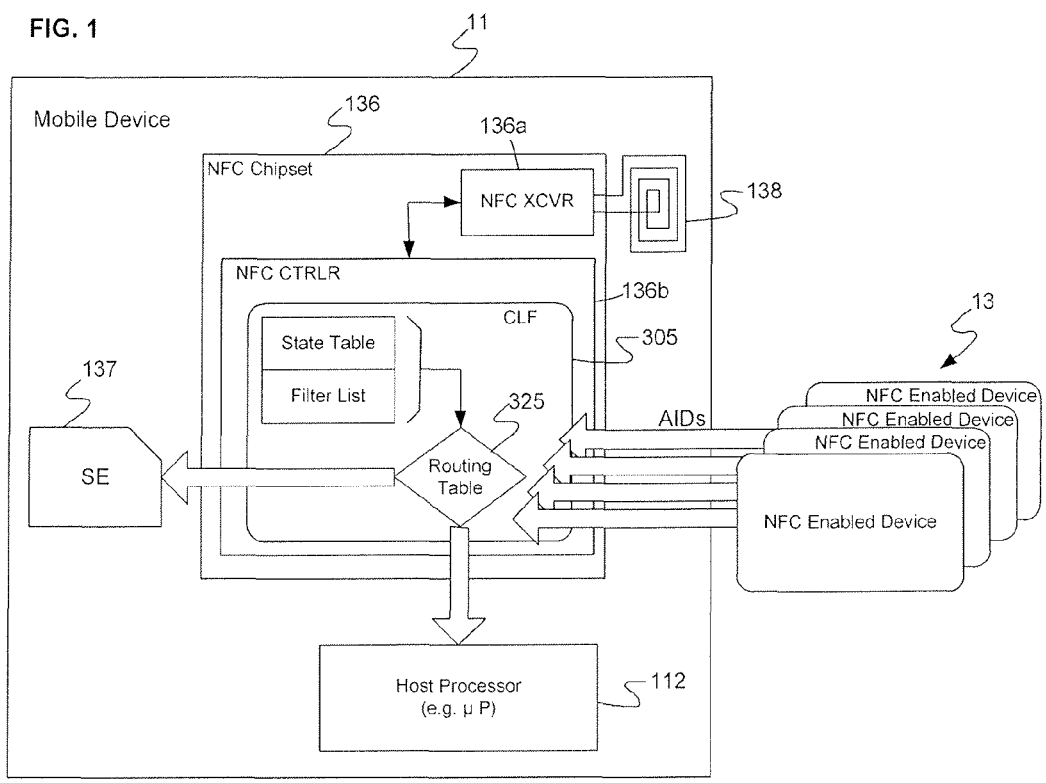
FIG. 1 illustrates a mobile device and a number of NFC enabled devices, with the elements of the mobile device that may be involved in NFC operations shown in high-level functional block diagram form.

The various examples disclosed herein relate to mobile device interaction with another device through short range wireless communication, such as Near Field Communication (NFC). By way of a high-level example, FIG. 1 illustrates a mobile device 11 and a number of NFC enabled devices 13. The mobile device 11 includes an NFC system in the form of a chipset 136 and an antenna, such as coil antenna 138, in the example. The NFC chipset 136 includes a near field communication transceiver (XCVR) 136a and a near field communication controller (CTRLR) 136b implementing a contactless front end (CLF) 305. In various examples, the contactless front end is configured to determine whether a security function is required and/or what the NFC operation mode is and block and/or route NFC communications accordingly.

The operation modes may include: (i) card emulation, (ii) peer-to-peer (P2P), and (iii) reader/writer. In card emulation mode, a mobile device acts as a contactless smartcard. In P2P mode, two NFC enabled devices (e.g., two mobile devices) exchange data bi-directionally. In reader/writer mode, an NFC enabled mobile device reads data from and/or writes data to an NFC enabled device, such as an RFID card, tag or the like. For example, when the mobile device is used as a reader in communication with an NFC enabled device, the NFC controller of the mobile device reads a data message from an NFC enabled device and sends the data message to the SE for a security evaluation. When the mobile device is used as a writer, the NFC controller of the mobile device receives security information (e.g., a key) from the SE that is sent to the NFC enabled device.

The NFC communication not requiring a security function is routed between the NFC communication system and a host processor 112 of the mobile device 11 without going to or from the security element (SE) 137. Communication that requires a security function is routed between the NFC system and the security element 137 without going to or from the host processor 112. In some examples, a remote server provisions the secure element 137 of the mobile device 11 to allow the host processor 112 to further process the information of the NFC communication.

Hence, the CLF 305 of the NFC controller 136b implements a routing function, as represented by the routing table 325. At a high level, the routing function determines whether each message from an NFC enabled device 13 goes to the secure element 137 or to the host processor 112, for example, based on the application identifier (AID) in the message and the routing table. The routing function may also block some NFC messages from going further into the mobile device or pass some messages to the secure element 137 in a manner which limits that element's handling of such messages. As will be discussed in more detail below, the blocking and/or message handling limitation functions may be implemented in accordance with information in a state table and/or a filter list associated with or incorporated into the routing table 325 of the contactless front end 305.

For example, the NFC controller 136b may include a filter list for controlling the contactless front end. Based on the filter list, the NFC controller evaluates a data message and controls whether or not the data message is transmitted further into the mobile device. The filter list, for example, may establish whether filtering applies or not based on states of operational content of the mobile device. When the filter list is applied, the filter list configures to the contactless front to selectively block and selectively route the data message further into the mobile device.

Figure 2A:
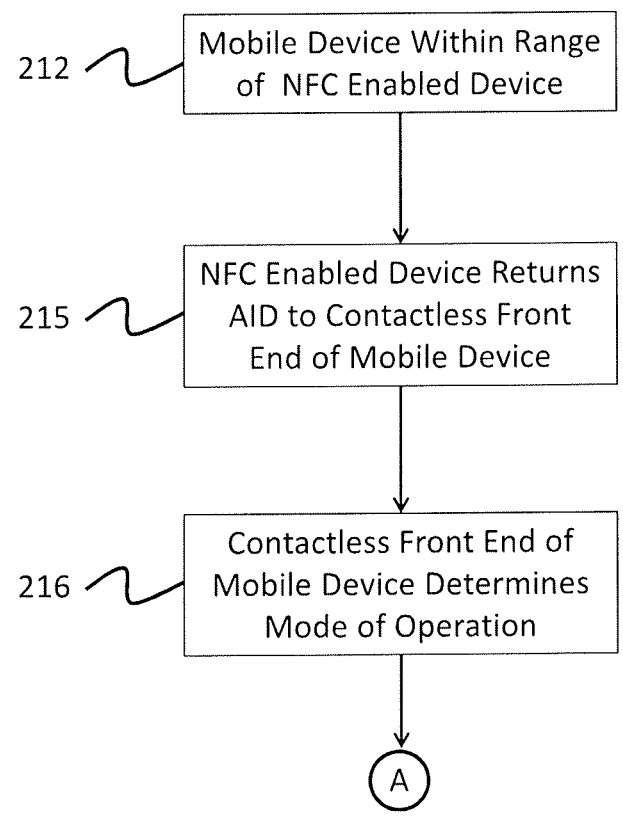
FIGS. 2A to 2C together form a flow chart diagram, which illustrates operation of near field communication (NFC) communication.
Figure 2B:
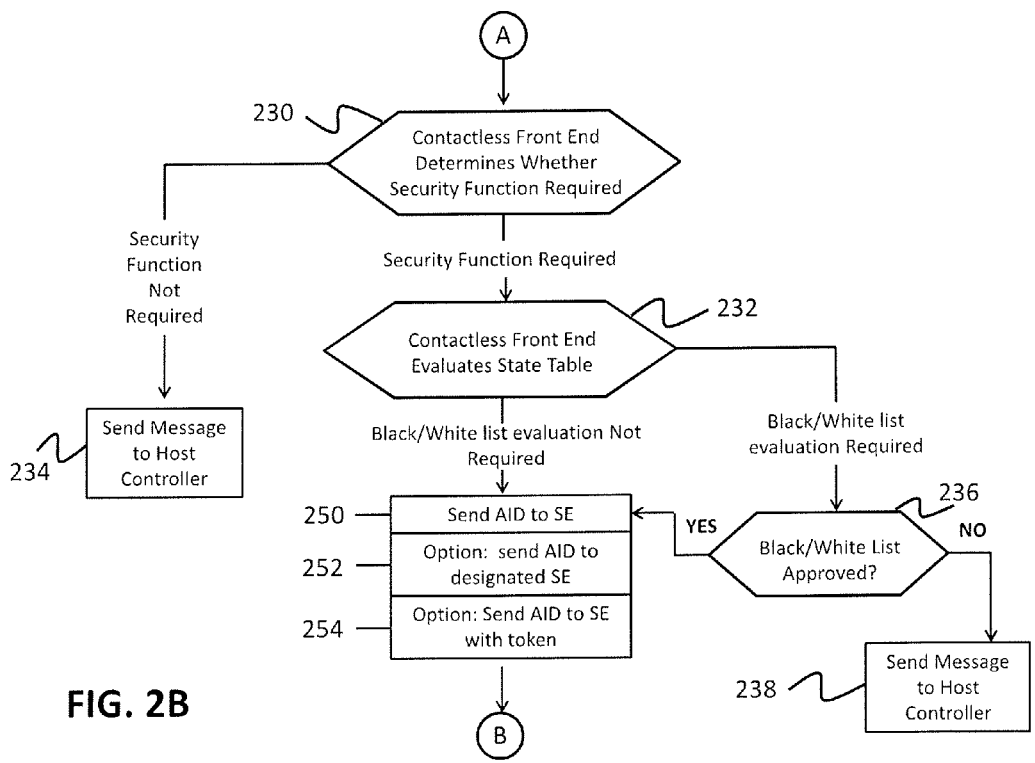
Figure 2C:
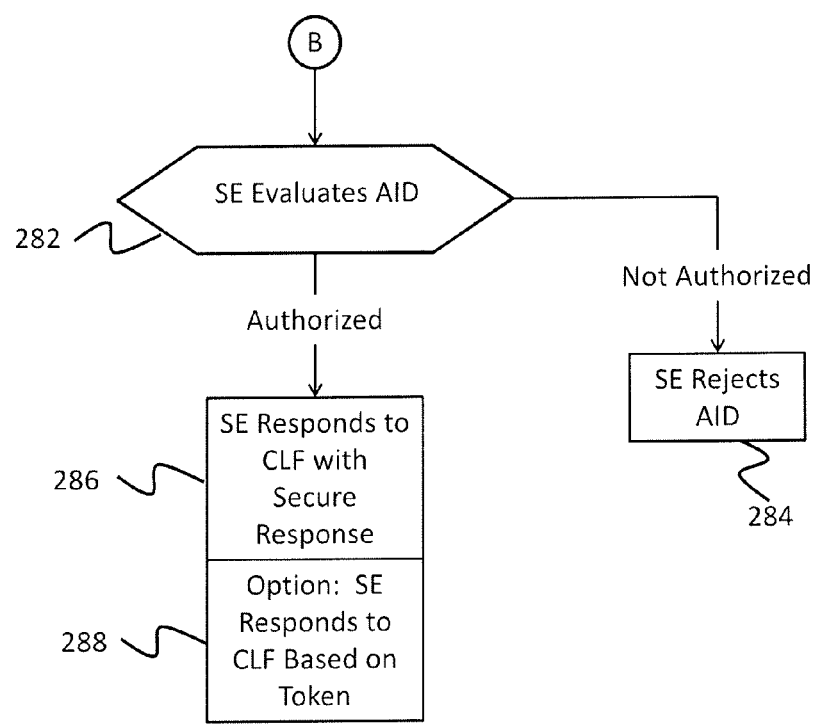

With that high level introduction, it may be helpful next to consider an exemplary process flow in more detail, with references to FIGS. 2A to 2C, which together form a process flow diagram illustrating use of the filter list. Referring first to FIG. 2A, at step (212), the mobile device is placed within range of the NFC-enabled device. The NFC-enabled device may be, for example, a POS terminal which is located within a retail store. The user can simply tap his/her mobile device to the POS terminal. Thus, the user brings the NFC-enabled device within proximity of the NFC-enabled device 13 and within proximity of the NFC sensor (in our example formed by NFC transceiver/chip set 136 and antenna 138). In this example, the NFC-enabled device 13 initiates communication with the mobile device 11 by acting as an initiator and generating an RF field. At step 214, NFC-enabled device 13 provides a data message to the contactless front end of NFC controller 136b. As an example, the data message can include a token, an application identification (AID), and a payload (e.g. URL link message to be displayed on mobile device), etc. At step 216, the contactless front end of NFC controller 136b determines the mode of operation for the present NFC communication. The communication may be, for example, read/write or P2P. The mode of operation is determined by NFC controller 136b as defined by the International Organization for Standardization (ISO) 14443 Standard. Processing then proceeds to FIG. 2B via off page connector A.

Processing then proceeds to step 230 where the contactless front end determines whether SE 137 is to process the Application Identification. Thus, the contactless front end of NFC Controller 136b determines whether a security feature (e.g. processing by SE 137) should be used with this data message. Any payment transaction between the mobile device 11 and the NFC-enabled device 13 requires a security feature. Furthermore, payloads that include information that direct a mobile device to a URL may require a security feature. Business card exchange, however, may not require a security feature. If a security function is not required, then, at step 234, the contactless front end 136 signals microprocessor 112 and the application identification is processed by microprocessor 112 without being processed by SE 137. If a security function is required, then the contactless front end of NFC controller 137b will evaluate the filter list. This may be, for example, the exemplary filter lists which appear in FIGS. 5 and 6. If filtering occurs, then processing proceeds to step 236 to determine whether the Application Identification has been approved for processing by SE 137. If the data message has not been approved, then NFC controller 136b prevents the Application Identification from going past NFC controller 136b. Instead, NFC controller 136b signals back to NFC-enabled device 13 that the Application Identification will not be accepted (i.e. it will not be transmitted or processed further within mobile device 11). If black/white list evaluation is not required or if the application identification is on the black/white list as being allowed, then the Application Identification is sent from NFC Controller 136b to SE 137.

As previously described, mobile device 11 may include more than one secure element. If mobile device 11 includes more than one secure element, then the application identification can be sent to a specific secure element depending upon the contents of the filter list. For example, the specific secure element may be designated by the black/white list (step 252).

Another option is for only portions of a secure element to be available to the Application Identification. An example of how to implement this feature is for the Application Identification to include a token. When the Application Identification is sent from NFC controller 136b to the SE 137, the SE 137 evaluates the token to determine whether features of the SE 137 are unavailable to the Application Identification (step 254). In this manner, while further processing of the Application Identification is not prevented, the amount of processing that it receives is limited. Processing then proceeds via off page connector B.

In FIG. 2C, step 282, SE 137 evaluates the Application Identification to determine if the Application Identification is authorized to receive a response from SE 137. If the Application Identification is authorized to generate a response from SE 137, then SE 137 responds to NFC Controller 137b with a secure response. As an option, if a token is embedded in the Application Identification, SE 137 evaluates the token and, while certain features of SE 137 may be available, other features of SE 137 may be suppressed based on the evaluation. At step 284, if SE 137 evaluates the Application Identification and determines that none of the features of the SE 137 should be available to the Application Identification, then SE 137 rejects the Application Identification and signals host controller 112 that SE 137 is not available.

Figure 3:
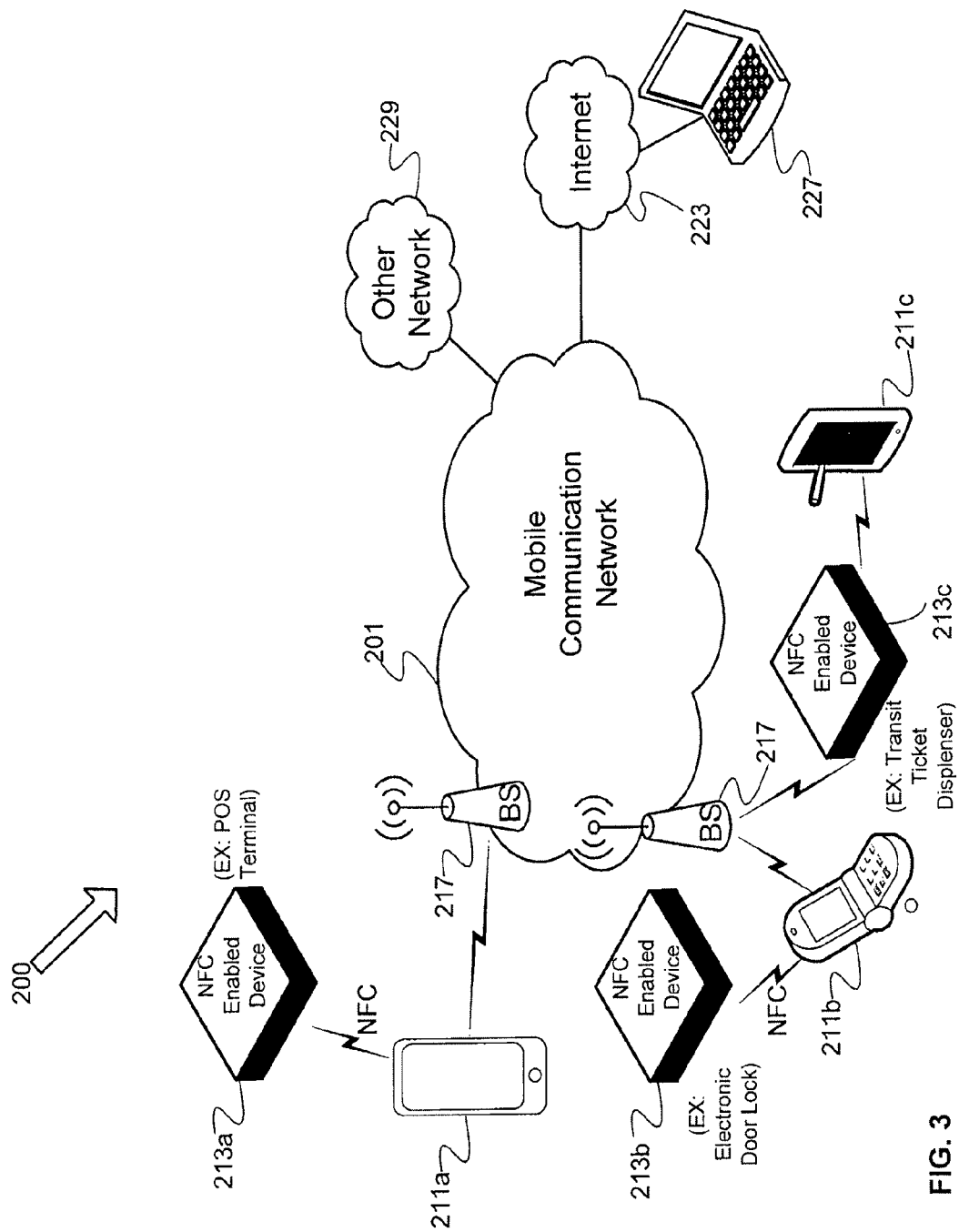
FIG. 3 is a high-level functional block diagram of a system offering a framework to provide NFC (near field communication) communication between a mobile device and an NFC-enabled device.

To place the NFC functions outlined above in context, it may be helpful to consider an overall system in which a number of mobile devices operate for NFC and other communications. FIG. 3 illustrates a system 200 offering a framework to provide NFC communication between a mobile device (e.g., 211a-211c) and an NFC enabled device (e.g., 213a-213c). The example of FIG. 3 shows several mobile devices 211a-211c (collectively referred to as mobile devices) that are examples of devices that may be used for communicating with NFC enabled devices 213a-213c (i.e., through NFC communication) when a mobile device is in close proximity to a respective NFC enabled device. Each mobile device may have access to mobile communication network 201. NFC enabled device 213a may be, for example, a point of sale (POS) terminal. NFC enabled device 213b may be, for example, an electronic door lock. NFC enabled device 213c may be, for example, a transit ticket dispenser.

NFC enabled devices 213a to 213c each include an NFC system configured to communicate with NFC capable mobile devices 211a to 211c. Each NFC enabled device 213a to 213c provides two-way wireless communication of information in accordance with NFC technology and protocols. For example, a mobile device 211a can communicate with an NFC enabled device 213a to provide preferences or payment information and/or receive information from the NFC enabled device 213a. In general, NFC enabled devices may be stationary (e.g., at an entrance as part of a keyless entry system or embedded in a smart poster), or mobile (e.g., another NFC enabled mobile device).

As will be discussed in more detail below, in the example, each NFC enabled mobile device 211a to 211b utilizes an at least partially individualizable filter list for controlling the internal flow of NFC communications within the device. Based on the filter list, a data message is evaluated and the result determines whether or not the data message is transmitted further into the mobile device. The filter list, for example, may establish whether filtering applies or not based on operational states (e.g. low power, no power, etc.) of the particular mobile device. When the filter list is applied, the filter list configures to the mobile device to selectively block and selectively route the data message further into the mobile device.

In the example of FIG. 3, the mobile communication network 201 provides communications for mobile devices 211a and 211b as well as for mobile devices/users that do not participate in NFC-based services (e.g., regular mobile devices such as cell phones, tablet computers, etc., that do not include NFC chip sets or devices that have such chip sets but whose users do not participate in any NFC-based service). Thus, network 201 may provide regular voice and data cellular services. The network 201 provides wireless communications services to the mobile devices shown and other mobile devices (not shown), via a number of base stations (BSs) 217. The present techniques may be implemented in any of a variety of available mobile networks 201 and/or on any type of mobile device compatible with such a network 201, and the drawing shows only a very simplified example of a few relevant elements of the network 201 for purposes of discussion here.

The mobile communication network 201 may be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Long Term Evolution (LTE) standard, or other standards used for public mobile wireless communications. In one example, the mobile devices 211a and 211b are capable of voice telephone communications through the network 201, and for receiving provisioning information from the provisioning server 233. The mobile devices 211a to 211c are capable of data communications through the particular type of network 201, and the users thereof typically will have subscribed to data service through the network.

The mobile communication network 201 can be implemented by a number of interconnected networks. Hence, the overall network 201 may include a number of radio access networks (RANs), as well as regional ground networks interconnecting a number of RANs and a wide area network (WAN) interconnecting the regional ground networks to core network elements. A regional portion of the network 200, such as that serving mobile devices 211a to 211c, can include one or more RANs and a regional circuit and/or packet switched network and associated signaling network facilities.

Physical elements of a RAN operated by one of the mobile service providers or carriers include a number of base stations represented in the example by the base stations (BSs) 217. Although not separately shown, such a base station 217 can include a base transceiver system (BTS), which can communicate via an antennae system at the site of base station 217 and over the airlink with one or more of the mobile devices, when the mobile devices 211a to 211c are within range. Each base station 217 can include a BTS coupled to several antennae mounted on a radio tower within a coverage area often referred to as a "cell." The BTS is the part of the radio network that sends and receives RF signals to/from the mobile devices 211a to 211c that are served by the base station 217. The network can also include other elements that support functionality other than device-to-device media transfer services such as messaging service messages and voice communications. Specific elements of the mobile communication network 201 for carrying the voice and data traffic, and for controlling various aspects of the calls or sessions through the network 201, are omitted here for simplicity. It will be understood that the various network elements can communicate with each other, as well as other aspects of the mobile communication network 201, and other networks (e.g., the public switched telephone network (PSTN) and the Internet 223) either directly or indirectly.

The carrier may also operate a number of systems that provide ancillary functions in support of the communications services and/or application services provided through the mobile communication network 201, and those elements communicate with other nodes or elements of the mobile communication network 201, such as one or more private IP type packet data networks 229 (sometimes referred to as an Intranet), i.e., a private network. Generally, such systems are part of or connected for communication via the private network 229 of the establishment discussed herein. It will be understood that systems outside of the private network could serve the same functions as well.

Figure 4:
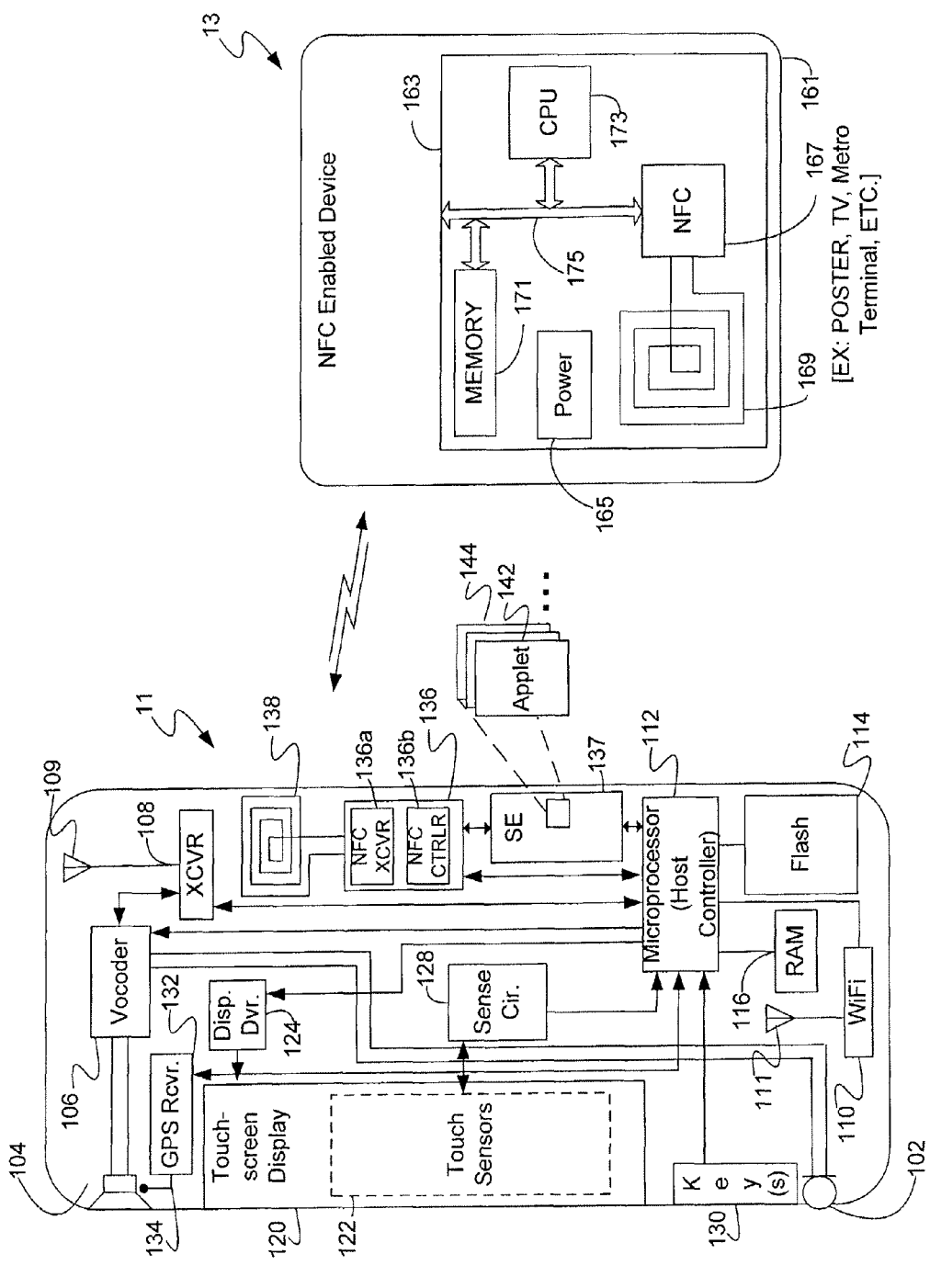
FIG. 4 is a high-level functional block diagram of an exemplary mobile device and an NFC-enabled device.

FIG. 4 provides a somewhat more detailed illustration of elements of a mobile device 11 and an NFC enabled device 13 and depicts a relatively short range wireless communication between the mobile device 11 and an NFC enabled device 13. In the example, the mobile device 11 will filter NFC communications. A filter list, for example, may establish whether filtering applies or not based on states of operational content of the mobile device. When applied, the filter list configures the device to selectively block and selectively route the data message further into the mobile device.

The drawing shows mobile device 11 by way of an example of one of the devices 211a to 211c of the environment 200 of FIG. 4; and the drawing shows NFC enabled device 13 by way of an example of one of the devices 213a to 213c. The NFC enabled device 13 represents any one of a variety of NFC enabled devices, including automatic teller machines (ATM), metro terminals, television consoles, posters, locks to contactless entry systems, and the like, which include an NFC chipset. The example uses a NFC system in the mobile device 11 to communicate with the NFC enabled device 13, for example, to provide data to or receive information from the NFC enabled device 13. In an exemplary process, the following steps may take place. At a high level, the user brings the NFC enabled mobile device 11 within proximity (e.g. 2 to 4 cm or less, although in some cases the distance may be up to 20 cm) of the NFC enabled device 13. An application installed on the mobile device 11 listens for NFC events and commences a contactless data flow by establishing communication with the NFC enabled device 13.

In a card emulation mode, the NFC enabled device 13 (e.g., a point of service (POS) terminal, a subway gate, a personal computer, etc.) generates a magnetic field via its antenna 169 and initiates the transaction with the mobile device 11. The magnetic field carries the low-level protocol exchange to perform the payment transaction similar to a payment transaction between a card and a payment terminal. The terminal 13 is the initiator of the exchange and the mobile device answers to the commands sent by the terminal 13. The NFC controller 136b forwards data received from the terminal 13 to the SE 137 for authentication. When the authentication criterion (or criteria) is met, secure information from the SE 137 is released from the SE 137 through the NFC controller 136b to the NFC enabled device 13 (POS terminal in this example).

In a second mode of operation, such as peer-to-peer (P2P), the mobile device 11 initiates a data exchange with another device (e.g., second NFC enabled mobile device). Such data exchange is defined in the ISO 18092 standard. In P2P mode, both devices (mobile device 11 and NFC enabled device 13 in this example) play a symmetric role in that both may generate a magnetic field and transmit and receive data. A typical use case for P2P communication is exchange of "business cards" between two handsets. Traditionally, such exchange is controlled by the host processor 112, without involvement of a security function, leaving the recipient of a payload potentially vulnerable to malware. However, the example uses the NFC controller 136b of the mobile device 11 to first determine whether a security function is required. Only after determining that the security function is not required, is the payload sent to the host processor 112 for processing without involving the use of the SE 137. However, if it is determined that a security function is required, the payload from the NFC enabled device 13 is evaluated by the rule-set of the security element 137 before the information in the payload is routed to the host processor 112. For example, only if the authentication criterion is met by the SE 137 does NFC controller 136b allow the host processor 112 to receive or process the information from (or provide information to) the NFC enabled device 13.

In a read and/or write mode, the mobile device 11 initiates communication with an NFC enabled device 13. In this (read and/or write) mode, the mobile device 11 is used to emulate the behavior of a contactless card reader. For example, the mobile device 11 communicates with an NFC enabled device 13 (e.g., NFC enabled "smart poster") to access digital content. When a mobile device 11 is brought within range of the smart poster, the NFC controller on the mobile device 11 detects the presence of a contactless tag, generates a magnetic field, which is used to power the contactless tag. Of course, the NFC enabled device 13 may also have its own power source. The NFC enabled device 13 (smart poster in this example) may be part of a marketing campaign. The NFC enabled device 13 responds with relevant content, such as a URL, SMS text message, coupon code for a discount, etc. Traditionally, such exchange is controlled by the host processor 112, without involvement of a security function, leaving the mobile device 11 vulnerable to potential malware. For example, instead of information that pertains to the poster, the payload may lead to a malicious site or include dangerous command structures, like to "download application, install it, and periodically send location information to a server."

The read/write example uses NFC controller 136b of the mobile device 11 to make a first determination as to whether the data message is authorized to access a security function within SE 137. Upon determining that a security function is not required, the data message is sent to the host processor 112 for processing without involving the SE 137 in the interaction. However, if it is determined that a security function is required, the data message from the NFC enabled device 13 is evaluated by the rule-set of the SE 137. As in the P2P case, in one example, only if the authentication criterion is met by the SE 137 does NFC controller 136b allow the host processor 112 to process the data message (e.g., link to an URL) provided by the NFC enabled device (e.g., smart poster) 13.

Upon receipt of the data message from the NFC enabled device 13, the SE 137 makes a second determination as to whether the data message is authorized to access a security function within SE 137. If SE 137 determines that the data message is not authorized to access a security function within Se 137, then the SE 137 rejects the data message and does not take any further action (other than to inform host processor 112 that the data message has been rejected). Host processor 112 may then take several actions, including (for example) displaying an error message on touch screen display 120, transmitting an error message via the contactless front end 136, etc.

In an example, more than one secure element is included in mobile device 11. In this embodiment, NFC controller 136b determines which secure element is to process the data message. NFC controller 136b may determine which secure element is to process the data message based on, for example, content of the data message. For example, there may be one secure element that handles financial transactions and another secure element that handles access to premises. A data message relating to financial transactions may be processed by one secure element while a data message relating to premises access may be handled by another secure element.

In another example, although the data message is being processed by SE 137, it may be desirable to impose restrictions on how SE 137 processes the data message. These restrictions include restrictions on how SE 137 responds to the data message. To accomplish this feature, a token, for example, may be inserted into the data message. When the SE 137 receives the data message, the SE 137 evaluates the token to determine if there are restrictions on how the secure element processes the data message. The SE 137 then responds to the data message based on the token that is included in the data message.

NFC controller 136b includes a routing table to determine which data messages are eligible for transmission to SE 137. Each data message is received by mobile device 11 with an Application Identification. Application Identifications may be of different types. For example, NFC Enabled Device 13 may be a POS system which transmits to mobile device 11 with one type of Application Identification. As another enabled device, a door lock may transmit to mobile device 11 with another type of Application Identification. Mobile device 11 is programmed to evaluate each Application Identification to determine whether each Application Identification is eligible to be transmitted to SE 137. Thus, for example, an Application Identification transmitted by a door lock may be eligible to be transmitted to SE 137 while an Application Identification transmitted by a POS system may not be eligible to be transmitted to SE 137.

Although an Application Identification may be eligible to be transmitted to SE 137, it may be desirable to impose restrictions on how SE 137 responds to the Application Identification that is received. Thus, as previously explained, a token may be inserted into the Application Identification. Upon receipt of the Application Identification by SE 137, SE 137 evaluates the token to determine if there are limitations on how SE 137 should respond. SE 137 then responds based on the limitations which correspond to the inserted token.

The mobile device 11 may also implement a filter function with respect to the NEC routing for the various types of transactions outlined above. In such an implementation, a filter list is incorporated into, for example, NFC Controller 136*b*. Based on the contents of the filter list, a data message is either allowed to be transmitted further into mobile device 11, or the data message is rejected and it does not pass further into mobile device 11. If the data message is allowed to be transmitted further into mobile device 11, then the data message is routed to a destination in mobile device 11, such as the SE 137 or the processor 112. By not routing the data message to either SE 137 or processor 112, the data message is prevented from either directly accessing or indirectly accessing SE 137, which provides additional security measures thereby further enhancing NFC security. Alternately, the filter list may permit the data message to (directly or indirectly) access SE 137 with limitations on the security function(s) which are available to the data message.

The different NFC modes of operation may be implemented via a variety of types of mobile devices having a host controller 112, memory 116 and 114, NFC 136 with a security element 137, and an NFC enabled device 13, which often will also include a processor, memory and an RF (contactless) communication capability. It may be helpful to consider examples of a mobile device 11 and an NFC enabled device 13 in somewhat more detail.

FIG. 4 illustrates elements of the mobile device 11 and elements of the NFC enabled device 13 in functional block diagram form, at a relatively high level. First, we will consider the mobile device 11.

It should be appreciated that the disclosed subject matter may be implemented using any mobile computing device having NFC communication capability and mobile communication capability, configured to use those capabilities to conduct mobile transactions, e.g. for purchasing and data exchange, as discussed herein. In the example of FIG. 3, the mobile device 11 is in the form of a smart phone type mobile handset including a touch screen display 120. Examples of touch screen type mobile devices that may be used to implement mobile device 11 may include (but are not limited to) a smart phone, personal digital assistant (PDA), tablet computer or other portable device with NFC capability. However, the structure and operation of the touch screen type mobile device 11 is provided by way of example; and the subject technology as described herein is not intended to be limited thereto. For purposes of this discussion, FIG. 4 provides a block diagram illustration of the exemplary mobile device 11 having a touch screen display for displaying content and receiving user input as (or as part of) the user interface.

Although the transactions that are the focus of discussions here utilize data communications, a typical mobile device such as the exemplary smart phone 11, also supports voice communications. Hence, in the example shown in FIG. 4, the mobile device 11 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 4, the mobile device 11 includes at least one digital transceiver (XCVR) 108, for digital wireless communications via a wide area wireless mobile communication network, although the mobile device 11 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 108 provides two-way wireless communication of information including digitized audio signals, still image and/or video signals, web page information for display as well as web related inputs, and various types of mobile message communications to/from the mobile device 11.

On-line transaction related communications involving information obtained from the NFC enabled device 13 often utilize Internet Protocol (IP) packet data transport utilizing the digital wireless transceiver (XCVR) 108 and over the air communications to and from base stations of the serving mobile network. Such communications may include specific account related data and security information from the mobile device 11, as well as payload information received from an NFC enabled device 13 during a particular transaction. Accordingly, such wireless transaction data communications may include at least some of the data obtained from the NFC enabled device 13.

In one example, the transceiver 108 also sends and receives a variety of signaling messages in support of various voice and data services provided by a network of a wireless service provider, to a user of mobile device 11 via the mobile communication network. Transceiver 108 connects through radio frequency (RF) send-and-receive amplifiers (not separately shown) to an antenna 109. Transceiver 108 may also support various types of mobile messaging services, such as short message service (SMS), enhanced messaging service (EMS), and/or multimedia messaging service (MMS). Although transaction communications involving account data obtained from the NFC enabled device 13 typically utilize IP data transport, such transaction communications may at times utilize one or more of these mobile messaging services for the data transport through the mobile communication network.

Many modern mobile devices also support wireless local area network communications over WiFi, instead of or in addition to data communications using the wide area mobile communication network. Hence, in the example of FIG. 4, for packet data communications, the exemplary mobile device 11 may also include a WiFi transceiver 110 and associated antenna 111. Although WiFi is used here as the example, the transceiver 110 may take the form of any available two-way wireless local area network transceiver of a type that is compatible with one or more standard protocols of communication implemented in wireless local area networks, such as one of the WiFi standards under IEEE 802.11 and/or WiMAX. The transceiver 110, for example, may provide two-way data transport for wireless communication with a wireless access point in a residence or enterprise that the user frequents or with any available hotspot offered in a public venue. Although communicating through a different network or networks, the transceiver 110 supports various types of data communications similar to the packet data communications supported via the mobile network transceiver 108, including communications related to transactions involving data obtained from the NFC enabled device 13.

The mobile device 11 further includes a microprocessor, sometimes referred to herein as the host processor 112, which serves as a programmable controller for mobile device 11 by configuring mobile device 11 to perform various operations, for example, in accordance with instructions or programming executable by processor 112. For example, such operations may include various general operations of the mobile device 11 as well as operations related to the communication with the NFC enabled device 13 and conducting related transactions as described herein. A flash memory 114 is used to store, for example, programming or instructions for execution by the processor 112. Depending on the type of device, the mobile device 11 stores and runs an operating system through which specific applications may be run on the device. Examples of operating systems include Android, Apple iOS (I-Phone or iPad devices), Windows Mobile, RIM BlackBerry operating system, or the like. Flash memory 114 may also be used to store mobile configuration settings for different mobile applications or services executable at mobile device 11 (using processor 112). Mobile device 11 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with the NFC enabled device 13 and related transactions, as described herein. Program aspects of the technology may be thought of as "products" or "articles of manufacture" typically in the form of executable code or process instructions and/or associated data that is stored on or embodied in a type of machine or processor readable medium.

A mobile device supporting read/write, P2P, and card emulation and related transaction communications of the type under consideration here, may include a variety of different types of user interface elements. For discussion purposes, in the smart phone example shown in FIG. 4, the user interface elements of mobile device 11 include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 11 and keys 130 may correspond to the physical keys of such a keyboard. Alternatively, keys 130 (and keyboard) of mobile device 11 may be implemented as "soft keys" of a virtual keyboard graphically represented in an appropriate arrangement via touch screen display 120. The soft keys presented on the touch screen display 120 may allow the user of mobile device 11 to invoke the same user interface functions as with the physical hardware keys. In some implementations, the microphone 102 and speaker 104 may be used as additional user interface elements, for audio input and output, including with respect to some functions related to the transaction processing and communication, as described herein.

For output, touch screen display 120 is used to present information (e.g., text, video, graphics or other visible content) to the user of mobile device 11. Host processor 112 controls visible display output on the LCD or other display element of the touch screen display 120 via a display driver 124, to present the various visible outputs to the device user. For example, some of the transaction related programming may cause the processor 112 to operate the driver 124 to cause screen 120 to display visible multimedia information about a product or service that the user may desire to purchase via a payment transaction using account information obtained from the NFC enabled device 13.

In general, touch screen display 120 and touch sensors 122 (and one or more keys 130, if included) are used to provide the textual and graphical user interface for the mobile device 11. In an example, touch screen display 120 provides viewable content to the user at mobile device 11. Touch screen display 120 also enables the user to interact directly with the viewable content provided in the content display area, typically by touching the surface of the screen with a finger or an implement such as a stylus.

As shown in FIG. 4, the mobile device 11 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The user interface capabilities of the mobile device 11 provide output to and receive input from the user of the mobile device 11, for any of the various functions, operations or applications of the device. For example, programming (discussed more later) that configures the mobile device 11 to obtain and act on information from the NFC enabled device 13 and causes the mobile device to perform a security function may include further acknowledgment requests from the user. For example, the mobile device 11 may present URL information read from the NFC enabled device 13 on the display 120 during a transaction on the account and prompt the user whether they indeed would like to visit the site.

Many implementations of mobile devices today support location based services, which are quite popular now, particularly with smart phone and tablet users. Location information today may be used in a variety of services/applications. Of note for purposes of this discussion, some uses or transactions involving account or other information obtained from or provided to the NFC enabled device 13 may also involve location determination. For example, the location information of the NFC enabled device 13 may be part of the information provided to the security element 137 or to a remote server (e.g., provisioning server discussed later) to determine the authenticity of the content provided by the NFC enabled device 13. By way of just one example, at this point in our discussion, the current location of the device 13 may be recorded in memory of the device and/or communicated to a server or other equipment involved in a transaction, when the mobile device communicates over a network (e.g. to conduct a transaction) using the information obtained from the NFC enabled device 13.

There are a variety of ways that a mobile device 11 may be configured to obtain information as to current location of the device. In our example, the mobile device 11 includes a global positioning satellite (GPS) receiver 132 and associated antenna 134. GPS is a space-based satellite navigation system that provides location and time information anywhere on Earth, where there is an unobstructed line of sight to at least three, or more of the GPS satellites. In other examples, trilateration or cell site/access point identification may be used.

The mobile device 11 also has NFC communication capability. NFC may be used for a variety of different functions or applications of the mobile device 11. However, for purposes of this discussion, the mobile device 11 interacts with the NFC enabled device 13 via the NFC communication capability of the mobile device 11. NFC is a set of standards for smart phones and similar devices, such as the exemplary mobile device 11 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC enabled mobile device or NFC enabled device (e.g., a smart poster, a contactless terminal such as that at a point of sale, etc.,) includes a transceiver configured to communicate with other NFC capable equipment.

Hence, the exemplary mobile device 11 further includes an NFC sensor. The NFC sensor may be implemented in a variety of ways. In the exemplary mobile device 11 of FIG. 4, the NFC sensor is a contactless front end which includes an NFC type radio frequency transceiver 136a, which is formed by an NFC chipset 136. The NFC chipset 136 provides two-way wireless communication of information in accordance with NFC technology and protocols. The NFC chipset 136 includes an NFC controller 136b. The exemplary NFC sensor also includes an antenna, such as coil antenna 138. The NFC chipset 136 of device 11 connects to the NFC coil antenna 138, for transmitting and receiving NFC communications to/from other NFC compatible devices with compatible transceivers over short air link distances. The transceiver 136a formed by the NFC chipset 136 also sends and receives a variety of signaling messages for establishing NFC links with other NFC-enabled devices and sends and receives various user data over the established NFC links. The signaling, for example, may allow the transceiver formed by the NFC chipset 136 to detect proximity of another NFC capable device, establish an NFC link with the other device, trigger execution of an appropriate application within the mobile device 11 and send and/or receive data for the application as between the mobile device 11 and the other NFC capable device. Some modern mobile devices are already coming equipped with such NFC equipment, and increased NFC deployment is expected in the near future.

In order to run secure applications such as payment, access to buildings, routing to an URL site, and the like, a SE 137 such as that described above is used. In one example, the SE 137 is separate chip that includes tamperproof storage and execution memory and is configured to communicate with an NFC controller 136b (a secure processor). The NFC controller 136b is different from the host processor 117 in that it focuses on enabling secure transactions. The SE 137 contains applications (e.g., applets) that use secure keys running inside the secure processor. For example, there may be at least one applet 142 for processing of the payment transaction; and at least one applet 143 for processing of at least one type of communication not related to a payment transaction, such as a read/write or P2P operation.

For example, the applications that run on the SE typically run on a Javacard operating system. The SE may include various account information, such as account number, user identification, a personal identification number (PIN), or the like for user verification and possibly account balance and/or transaction record information. The SE may be used to decode credentials of NFC enabled devices. In various examples, the secure element may be part of a subscriber identification module (SIM) chip or a separate secure element like a secure digital (SD) memory card used for storing and accessing applications and data in a secure manner.

Although cryptographic elements are not separately shown, the NFC chip 136 is also configured such that transmissions to the NFC enabled device 13 are encrypted. In one example, communications between the SE and the provisioning server may also be encrypted. Accordingly, the secure data storage and encrypted communication provide enhanced security and reduce the likelihood of fraud against a user's financial account.

In one example, the NFC controller 136b is configured to route all NFC traffic (e.g., data message from or sent to an NFC enabled device) through a SE 137. Put differently, the NFC controller 136b routes the NFC communication between the NFC system and the SE 137 first without going directly to or from the host processor 112.

However, it will be understood that not all applications require the use of a security function. For example, two mobile device users may want to exchange business cards. To this end, the NFC controller 136b should have the ability to send the information directly to the host processor 112 for further execution (without the security function of the SE 137). Accordingly, in one example, the NFC controller 136b is configured to determine whether a security function is required. If so, the NFC controller 136b routes the near field communication between the NFC system and the SE 137 without going to or from the host processor 310. However, upon determining that a security function is not required, the NFC communication is routed between the NFC system and the host processor 112 without going to or from the SE 137.

The NFC controller 136b determines whether a security function is required in various ways. For example, if the mode of operation is card emulation (e.g., payment), a security function is required to keep the transaction secure. Also, if the data message from the NFC enabled device 13 includes a key, a security function is required. In another example, if the payload of the data message includes a link to a Universal Resource Locator (URL), a security function is required. In another example, even if the communication may not require a security function (e.g., a simple transfer of a photo between two NFC enabled mobile devices) the user of the transferor or transferee (i.e., writing or reading) mobile device can request the transaction to be secure (e.g., by selecting "secure transfer" on the display of the mobile device). For example, the user of a mobile device can pre-configure their mobile device by selecting an option (e.g., on the user display) that requires information that is received and/or transferred to another mobile device to be secure. The security requirement may be with respect to all NFC communication or more focused (e.g., all mobile devices that are not on a "close friends" or "authorized" list stored in the mobile device). Thus, a mobile device that is pre-configured to receive secure NFC communication, routes the data message received from another mobile device to the SE for evaluation. If a security key is not included in the data message, then the message is deemed not secure. To assure that the data message is processed by the transferee mobile device, the NFC controller of the transferor mobile device includes a key (provided by the SE) in the data message. To this end, the transferor mobile device may be preconfigured to send data messages via NFC in a secure manner (i.e., with a key).

The logic implemented by the host processor 112 of the mobile device 11 configures the processor 112 to control various functions as implemented by the mobile device 11. The logic for a processor may be implemented in a variety of ways, but in our example, the processor logic is implemented by programming for execution by the microprocessor 112. Similarly, logic implemented by the NFC controller 136*b* configures the controller 136 to control various functions related to NFC communication. For example, one or more application programs are stored in the SE 137 memory for execution by the NFC controller 136*b*. Any application that is intended to utilize account related information obtained from the NFC enabled device 13 may include information stored in the SE 137 memory. For example, information in connection with a transaction with an NEC enabled device 13 is stored in the SE 137 memory, which when executed by the microprocessor 112 enables the mobile device 11 to perform transactions (e.g., purchase, ATM, unlock door, provide preferences to a TV console, etc.) with the NFC enabled device 13 using the NFC sensor formed by the NFC chipset 136 and the associated antenna 138. As disclosed above, transactions that meet a predetermined criteria (i.e., requiring a security function) are first routed through the SE 137.

The structure and operation of the mobile device 11, as outlined above, were described to by way of example, only.

The NFC enabled device 13 in our example includes a power supply module 165, an NFC transceiver 167 and associated coil antenna 169, and one or more memories 171. The NFC enabled device 13 may or may not include a processor serving as the central processing unit (CPU) 173 of the chip 163 and a bus system 175. For example, a CPU may not be included if the NFC enabled device 13 is used as a tag but otherwise is included if used in a P2P transaction. The NFC enabled device 13 may or may not include a battery or other internal power source. For example, instead of a power source, the power module 165 may collect energy at the time of a communication from the RF transmissions from the mobile device 11 via inductive coupling. Power may be obtained via the coil antenna 169 or another inductive coil (not separately shown) in or connected to the chip 163. The power module 165 converts the collected energy to one or more appropriate direct current (DC) voltage levels and distributes the resulting DC power to the other elements on the chip 163, as needed.

The exemplary NFC transceiver 167 connects to the coil antenna 169, for transmitting and receiving RF communications to/from the NFC enabled mobile device 11. Hence, the chipset 136 and NFC transceiver 167 are sufficiently compatible to enable the mobile device 11 to detect and communicate with an NFC enabled device 13. In one example, from the perspective of the card, the NFC enabled mobile device 11 can appear as a reader NFC enabled device. Put differently, the NFC enabled device 13 may act as a tag and the mobile device 11 may act as a reader when in read/write mode of operation.

The memory 171 of the NFC enabled device 13 stores data and/or executable programming for the CPU 173. For example, if the NFC enabled device 13 is configured as a smart poster, the memory may include URL information where the user of the mobile device 11 can obtain additional information. In one example, the memory 171 may also include a key that is used for security purposes by the SE 137 of the mobile device 11. For example, this key may be provided by a provisioning server (discussed later) during a prior provisioning process. Thus, in this smart poster example, they payload provided by the NFC enabled device 13 to the mobile device 11 includes digital payload (e.g., URL) and a key (provided by the provisioning server). The NFC controller 136*b* of the mobile device, upon determining that a security feature is required, sends the payload to the SE 137 for authentication. Upon authentication, the NFC controller routes the payload (e.g., without the key) to the host controller 112 for processing.

The bus 175 supports signaling and transfer of data and/or instructions as between various elements on the chip 163 including the CPU 173, the memory 171 and the NFC transceiver 167. The memory 171 and programming execution by the CPU 173 provide data storage.

The NFC enabled device 13 can be used in a variety of transactions/applications. Typical examples of actions using such an NFC enabled device include but are not limited to financial transactions (e.g., point of sale terminal), access control (e.g., a smart door or computing device that can be unlocked via an NFC, or TV that can be configured for user preferences), exchange of digital information (e.g., transferring and/or receiving photos between two mobile devices or serving as a smart poster), etc. By enabling the mobile device 11 to communicate with the NFC enabled device 13 in a secure manner, the uses of the NFC enabled device and the information read/obtained from the NFC enabled device can be extended to the user's mobile device 11. Using the NFC technology of the mobile device 11, one or more applications on the mobile device 11 can detect and interact with an NFC enabled device 13, to obtain and/or provide information to and/or from the NFC enabled device 13 and then use that information in a subsequent action.

The structure and operation of the NFC enabled device 13, as outlined above, were described to by way of example, only.

As noted, a filter list for control of the above-discussed routing of NFC communications from the NFC enabled device 13, within the mobile device 11, may be at least partially individualized incorporated into the NFC Controller 136*b*. Based on that list, the contactless front end can filter NFC communications that may otherwise pass through the NFC front end into the mobile device. For example, if certain transactions are set by a standard to require a security function, such functions may not be selectable by the user through the user display to remove from the filter list. Based on the contents of the filter list, a data message is either allowed to be transmitted further into mobile device 11, or the data message is rejected and it does not pass further into mobile device 11. If the data message is allowed to be transmitted further into mobile device 11, then the data message is routed to a destination in mobile device 11, such as the SE 137 or the processor 112. Alternately, the filter list may permit the data message to (directly or indirectly) access the SE 137 with limitations on the security function(s) which are available to the data message.

FIGS. 5 and 6 are exemplary filter lists which are evaluated to determine whether additional evaluation should be provided to an Application Identification in order to determine whether that Application Identification should be transmitted to SE 137 based on the operating state conditions of mobile device 11. The first row of FIG. 5 shows that when the contactless front end of NFC chipset 136 is under full power, touch screen display 120 is on and mobile device 11 is not locked, then the filter list is not used. If the Application Identification is the type that is eligible to be forwarded to SE 137, then the Application Identification is forwarded to SE 137. The second row illustrates the scenario where the contactless front end of NFC chipset 136 is under full power, touch screen display 120 is on and mobile device 11 is locked. In that scenario, the Application Identification is evaluated using the filter list. If touch screen display 120 is off, mobile device 11 is locked and the contactless front end of NFC chipset 136 is in a full power state, a low power state or is not being powered, the Application Identification is evaluated using the filter list.

FIG. 6 provides a further exemplary embodiment where the filter list is based on the location of mobile device 11. Thus, in a home, the Application Identification may be forwarded to SE 137 in order to make payments or to provide building access. Similarly, if mobile device 11 is at user's work place, then the Application Identification may be forwarded to SE 137 to make payments and to provide building access. If being used to obtain access to a subway (or other mass transit), SE 137 is available to provide building (i.e. subway) access but not to provide payments. If the mobile device 11 is at a department store, for example, then SE 137 can process the Application Identification to provide payments but not to provide building access.

FIGS. 7 and 8 illustrate exemplary filtering. FIG. 7 is a white list, where transactions subject to processing by SE 137 are specifically authorized. FIG. 8 is a black list where transactions which are prohibited from receiving processing by SE 137 are explicitly specified. In FIG. 7, for example, the user is only permitted to use mobile device 11 for shopping at specific department stores. Those department stores are specified in the table which is illustrated in FIG. 7. The Application Identification provides codes which identify respective department stores. Those codes are then evaluated and if the codes match codes in the white list, then the transaction is permitted in that department store. By contrast, FIG. 8 is a black list of prohibited transactions. Thus, for example, the black list may include department stores where transactions are not permitted to occur. If the Application Identification includes a code of a prohibited department store, then that code is matched on the black list and the Application Identification is prevented from being sent to the SE 137 for further processing.

In another example, all NFC communication is routed to SE 137. In this example, if the data message does not include a key, it is considered not secure. Consequently, SE 137 is prevented from processing the data message. In one example, the display of the mobile device indicates that the data message could not be authorized and provides an option to override the security feature. For example, the touch screen display can display a message requesting authorization to override the security feature. Permission to override the security feature can be entered via touch sensors 122. Put differently, the user of the mobile device can override the security function and select to have the data message processed (e.g., go to a URL) even if SE 137 cannot authenticate the security of the data message.

FIGS. 7 and 8 illustrate exemplary filtering. FIG. 7 is a white list, where forwarding Application Identifications to SE 137 are specifically authorized. FIG. 8 is a black list where forwarding Application Identifications to SE 137 are specifically prohibited. In FIG. 7, for example, the user is only permitted to use mobile device 11 for shopping at specific department stores. Those department stores are specified in the table filter list which is illustrated in FIG. 7. The application identification provides codes which identifies respective department stores. Those codes are then evaluated and if the codes match codes in the white list, then the Application Identification is permitted to be transmitted to SE 137 in that department store.

By contrast, FIG. 8 is a black list of Application Identifications. Thus, for example, the table may include department stores where the Application Identification is not permitted to be forwarded to SE 137. If the application identification includes a code of a prohibited department store, then that code is matched on the black list and the application identification is prevented from being sent to SE 137 for further processing.

Figure 9:
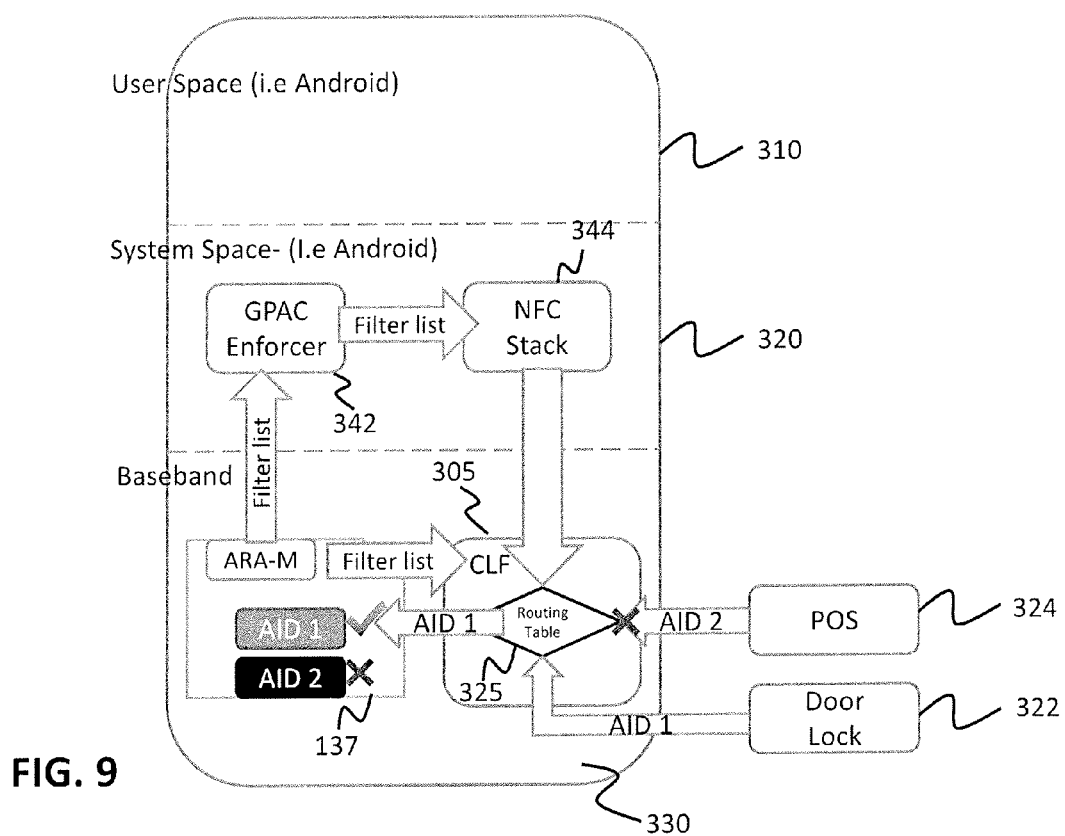
FIG. 9 is a block diagram which illustrates various logical components of the mobile device which is illustrated in FIG. 4.

FIG. 9 illustrates the logical components which may be implemented in mobile device 11. As shown, data within mobile device II is processed at a user space level 310, a system space level 320 and a baseband level 330. The contactless front end 305 is part of the NFC controller 136b. Application Identification 1 (AID 1) is a type of AID Application Identification that is received from door lock 322. AID 2 is a type of AID that is received from POS terminal 324. The state of mobile device 11 is such that the use of a filter list is permitted. The filter list indicates that AID1 is to be transmitted to SE 137 while AID 2 is to be prevented from being transmitted to SE 137.

As shown in FIG. 9, Routing Table 325 may be updated from SE 137. The use of a filter list is accomplished in Routing Table 325. Routing Table 325 stores a filter list that is used to determine whether an Application Identification should be sent to SE 137 for further processing. The filter list in Routing Table 325 is updated at various times. For example, the filter list may be updated from the mobile communications network each time mobile device 11 is booted up. The filter list may be updated at other times, such as the user requesting mobile device 11 to update the filter list from the mobile communications network, the mobile communications network initiating the update to the filter list at various times (or predefined times), or mobile device 11 automatically requesting the filter list update at various (or predefined times). For example, updates may be performed in response to particular types of NFC communications being attempted or particular types of content attempting to be transferred. When the updated filter list is transmitted to mobile device 11, the updated filter list may enter mobile device 11 via SE 137. While SE 137 has been illustrated as being within mobile device 11, SE 137 may be, for example, situated within a Universal Integrated Circuit Card (UICC) or what is sometimes informally referred to as a SIM card. SE 137 transmits the updated filter list to GPAC Enforcer 342. GPAC Enforcer 342 is a Global Platform Access Control which may be implemented in accordance with Global Platform Device Technology, Trusted Execution Environment Specification, Secure Element Access Control, Version 1.0, May 2012. GPAC Enforcer 342 may be implemented in host controller 112. GPAC Enforcer 342 places the updated filter list onto NFC stack 344 which may also be stored in host controller 112. Host controller 112 removes the updated filter list from NFC stack 344 and updates the filter list within Routing Table 325.

In the example shown in FIG. 9, the filter list within Routing Table 325 permits AID1 from Door Lock 322 to access SE 137 while AID2 from POS 324 is prohibited from accessing SE 137.

Figure 10:
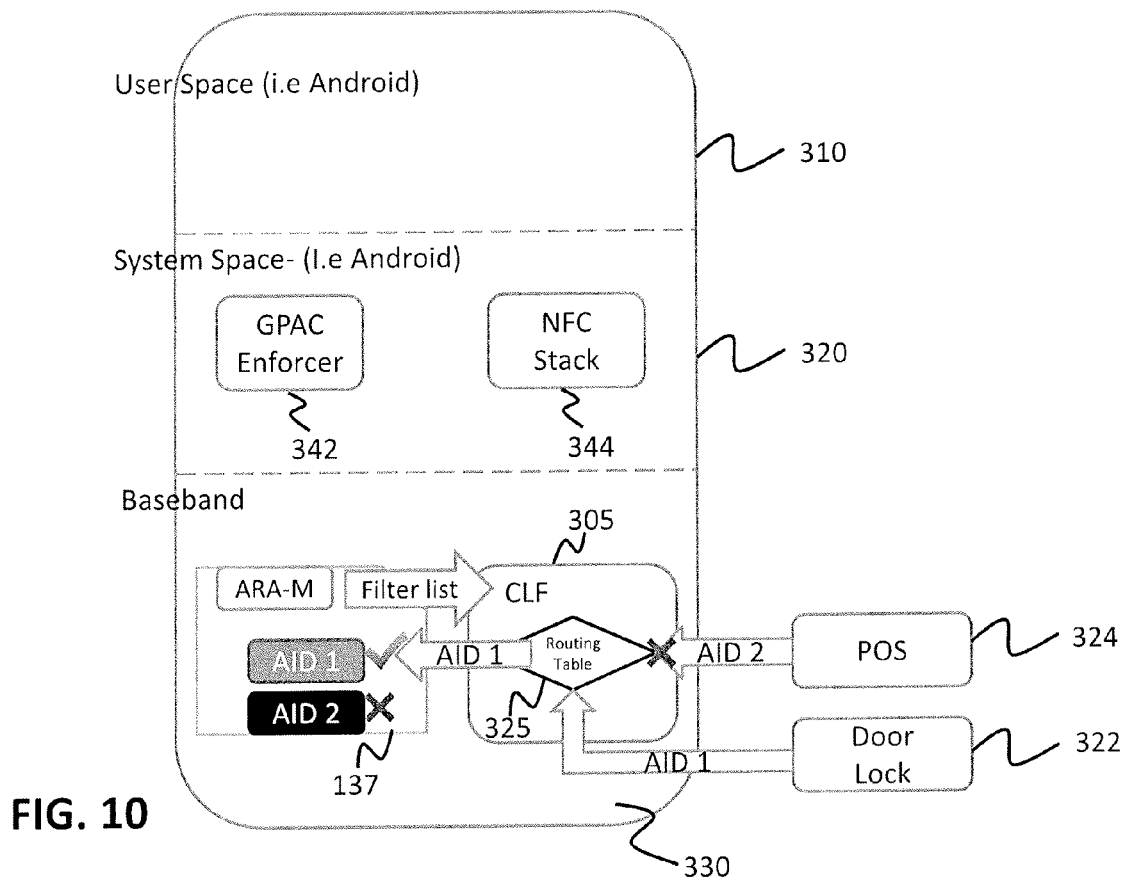
FIG. 10 is a block diagram which illustrates logical components of another example relating to logical components that may be implemented in the mobile device which is illustrated in FIG. 4.

FIG. 10 illustrates another exemplary embodiment, in which an alternative method is provided for updating the filter list within Routing Table 325. Again, AID 1 is provided from Door Lock 322 while AID 2 is provided by POS terminal 324. The filter list within Routing Table 325 determines that AID 1 may be forwarded to SE 137 while AID 2 is not to be forwarded to the secure element.

As shown in this alternative exemplary embodiment, the filter list again is provided within mobile device 11 via SE 137. GPAC enforcer 342 and NFC stack 344, however, are not involved in updating the filter list. Rather, in this exemplary embodiment, the filter list is transferred directly from SE 137 to Routing Table 325 within host controller 112 (without intervention of GPAC Enforcer 342 and NFC Stack 344).

Figure 11:
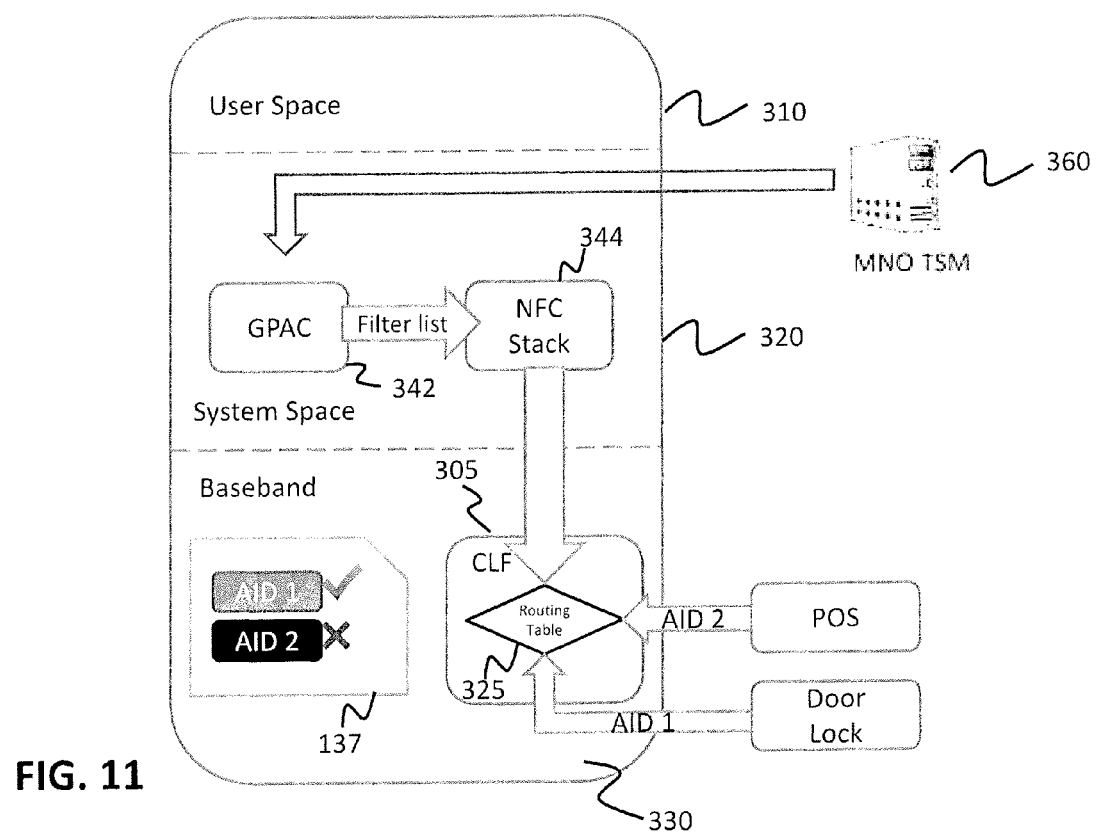
FIG. 11 is a block diagram which illustrates various logical components of yet another example relating to logical components that may be implemented in the mobile device which is illustrated in FIG. 4.

FIG. 11 illustrates yet another exemplary embodiment, in which yet another alternative method is provided for updating the filter list within Routing Table 325. In this exemplary embodiment, the filter list is updated without the use of SE 137. The filter list within Routing Table 325, however, again determined that AID 1 may be forwarded to SE 137 while AID 2 is not to be forwarded to the secure element.

As shown in this alternative exemplary embodiment, the filter list is provided by Mobile Network Operator Trusted Service Manager (MNO TSM) 360. MNO TSM 360 transmits the updated filter list to GPAC enforcer 342. GPAC enforcer 342 placed the updated filter list onto NFC stack 344. Host controller 112 removes the updated filter list from NFC stack 344 and updates the filter list within Routing Table 325.

Figure 12:
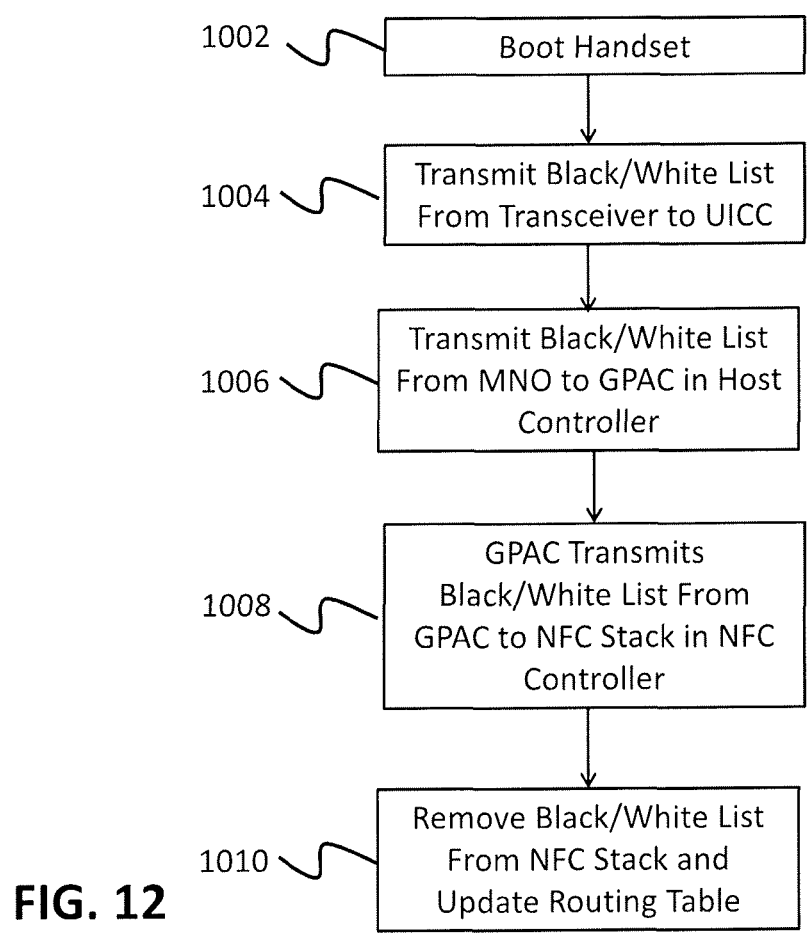
FIG. 12 is a flow chart diagram which illustrates an exemplary method of updating a routing table.

FIG. 12 is a flow chart diagram which illustrates a method for updating the filter list. At step 1002, mobile device 11 is booted. In the process of booting mobile device 11, an updated filter list is downloaded from the network and is received at transceiver 108. At step 1004, the filter list is transmitted from transceiver 108 to SE 137 (which may be within the UICC (or SIM card)). At step 1006 the filter list is transferred from SE 137 to the GPAC enforcer 342 in host controller 112. At step 1008, GPAC enforcer 342 transmits the filter list to the NFC stack 344 in NFC controller 136b. At step 1010 the filter list is removed from the NFC stack and Routing Table 325 in NFC Controller 136b is updated.

Figure 13:
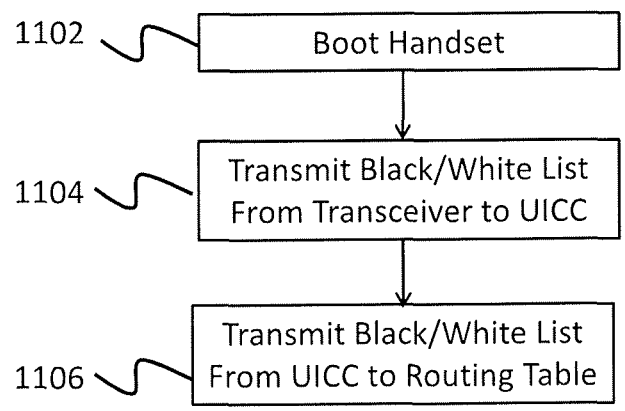
FIG. 13 is a flow chart of an alternate example of a method for updating the filter list in mobile device.

An alternate example is shown in the flow chart diagram of FIG. 13where another method is illustrated for updating the filter list in mobile device 11. At step 1102, mobile device 11 is booted up and an updated filter list is transmitted from the network to transceiver 108. At step 1104 the filter list is transmitted from transceiver 108 to SE 137 (which may be within the UICC (or SIM card). At step 1106, the filter list is transmitted from SE 137 to Routing Table 324 within NFC controller 136b.

As another alternative, it is possible to update the filter list in mobile device 11 without transmitting the updated filter list to SE 137. FIG. 11 illustrates the logical components that may be used to update the filter list without going through SE 137. One of ordinary skill in the art will recognize that there are numerous ways to update the filter list, and the examples shown herein are for illustrative purposes only.

Previously, NFC Controller 136b merely routed the data message which had been received via NFC communication. Based on the contents of the data message, the data message was transmitted further into mobile device 11, and NFC Controller 136b would determine the location to which the data message was transmitted. For example, if the data message related to a payment, and if mobile device 11 was fully powered and unlocked, then NFC Controller 136b forwarded the data message to SE 137. If, however, the data message related to a payment, and if mobile device 11 was either locked or not fully powered, then NFC Controller 136b forwarded the data message to processor 112. By contrast, in the examples described herein, a filter list is incorporated into, for example, NFC Controller 136b. Based on the contents of the filter list, the data message is either allowed to be transmitted further into mobile device 11, or the data message is rejected and it does not pass further into mobile device 11. If the data message is allowed to be transmitted further into mobile device 11, then the data message is routed to a destination in mobile device 11, such as the SE 137 or the processor 112. If it is rejected, then a message is sent back to NFC device 13 informing NFC device 13 that the data message has been rejected. By not routing the data message to either SE 137 or processor 112, the data message is prevented from either directly accessing or indirectly accessing SE 137. In this manner, the security function provided by SE 137 is unavailable to the data message. Alternately, the filter list may permit the data message to (directly or indirectly) access SE 137 with limitations on the security function(s) which are available to the data message.

For software functionality, programming, including executable code as well as associated stored data, (e.g. executable code and associated data files) may be used for applications running on the mobile device 11 for the host controller 112 and the NFC controller 136b. The software code is executable by the host controller 112 or the NFC controller 136b of the mobile device 11, although as noted, at times, such software may be stored in another computer platform and downloaded through a network for installation in the mobile device 11. Execution of such code by a host controller of the mobile device 11 and/or the NFC controller 136b enables the mobile device 11 to implement the methodology for handling the various NFC communications, conducting the associated action(s) and possibly providing relevant user input/output via the user interface of the device 11, in essentially the manner performed in the implementations discussed and illustrated herein.

Hence, aspects of the methods of NFC communication, provisioning of a mobile device, and related action processing outlined above may be embodied in programming. Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 201, 102, or 211 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

3GPP 3rd Generation Partnership Project
AID Application Identification
ATM Automatic Teller Machine
BS Base Station
BTS Base Transceiver System
CDMA Code Division Multiple Access
CLF Contactless Front End
CPU Central Processing Unit
CRM Customer Relations Management
DC Direct Current
EMS Enhanced Messaging Service
EVDO Evolution Data Optimized
GPS Global Positioning System
GSM Global System for Mobile
GUI Graphical User Interface
ID Identification
IP Internet Protocol
ISO International Organization for Standardization
LCD Liquid Crystal Display
LTE Long Term Evaluation
MMS Multimedia Messaging Service
NFC Near Field Communication
P2P Peer-to-Peer
PDA Personal Digital Assistant
PDN Packet Data Network
POS Point of Sale
PSTN Public Switched Telephone Network
RAM Random Access Memory
RAN Radio Access Network
RF Radio Frequency
SD Secure Digital
SE Secure Element
SIM Subscriber Identity Module
SMS Short Message Service
TDMA Time Division Multiple Access
UICC Universal Integrated Circuit Card
URL Universal Resource Locator
WAN Wide Area Network
XCVR Transceiver

The invention claimed is:

1. A mobile device comprising:
a transceiver for performing wireless mobile communication network communication;
a microprocessor for operating the mobile device;
one or more secure elements which execute a plurality of applications in a secure environment;
a memory for storing one or more filter lists; and
a near field communication system configured to perform wireless communication independent of the transceiver, the near field communication system including a contactless front end configured to:
receive a data message including an application identification from a near field communication device;
based on the application identification, determine whether a security function is required for processing the received data message;
in response to the determination that the received data message requires a security function, determine by using the application identification whether filtering of the received data message is required;
in response to a determination filtering of the received data message is required, evaluate the application identification included in the received data message against a filter list including application identifications; and
based on the results of the evaluation, transmit the data message to the one or more secure elements of the mobile device.

2. A mobile device according to claim 1, wherein the near field communication system is further configured to determine that filtering is required by:
establishing that one or more filter lists is to be applied to the data message based on operational states of the mobile device.

3. A mobile device according to claim 2, wherein the mobile device signals for a user of the mobile device to provide input to the mobile device, wherein the input is used to establish that one or more filter lists is to be applied to the data message.

4. A mobile device according to claim 2, wherein:
the mobile device measures an internal power level of the mobile device, and
the measured power level is used to establish that one or more filter lists is to be applied to the data message.

5. A mobile device according to claim 2, wherein the mobile device is configured to receive and process locations information to identify a location of the mobile device, and, the near field communication system is further configured to establish that one or more filter lists is to be applied to data message using the identified location of the mobile device.

6. A mobile device according to claim 2, wherein when the data message is received is used to establish that one or more filter lists is to be applied to the mobile device.

7. A mobile device according to claim 1, wherein the near field communication system is further configured to:
when a financial transaction is occurring with the near field communication device, transmit the data message to the one or more secure elements based on contents of the financial transaction.

8. A method comprising the steps of:
receiving, at a near field communication system of a mobile device, a data message including an application identification from a near field communication device, wherein the data message is received using wireless communication independent of a transceiver of the mobile device used to perform wireless mobile communication network communication;
based on the application identification, determining whether a security function is required for processing the received data message;
in response to the determination that the received data message requires a security function, determining by using the application identification whether filtering of the received data message is required;
in response to a determination that filtering of the received data message is required, evaluating the application identification included in the received data message against a filter list including application identifications; and
based on the results of the evaluation, transmitting the data message to the one or more secure elements of the mobile device.

9. The method of claim 8, wherein the determination whether filtering is required, comprises:
establishing that one or more filter list is to be applied to the data message based on operational states of the mobile device.

10. The method of claim 9, further comprising:
measuring by the mobile device internal power level of the mobile device,
wherein the measured power level is used to establish that one or more filter lists is to be applied to the data message.

11. The method of claim 9, further comprising GPS processing to identify location of the mobile device, and
wherein the determination whether filtering is required, comprises: establishing whether the filter list is to be applied or not be applied to the data message is based on the identified location of the mobile device.

12. The method of claim 9, wherein when the receiving of the data messages is occurring to establish that one or more filter lists is to be applied to the data message.

13. The method of claim 8, wherein in response to receiving another data message and determining that a security function is not required, the another data message is routed to a microprocessor in the mobile device.

14. The method of claim 8, wherein the near field communication system of the mobile device is configured to receive data messages from a plurality of different near field communication device types.

15. The method of claim 8, further comprising:
prompting a user of the mobile device to provide input to the mobile device, wherein
the input is used in the evaluation of whether the data message is transmitted further into the mobile device.

16. The method of claim 8, wherein in a financial transaction occurring with the near field communication device, the contents of the financial transaction are used in the evaluation of whether transmitting the data message is transmitted further into the mobile device is affected based on contents of the financial transaction.

17. A non-transitory machine-readable medium comprising instructions stored therein, which when executed by a machine, causes the machine to perform operations comprising:
receiving, at a near field communication system of a mobile device, a data message including an application identification from a near field communication device, wherein the data message is received using wireless communication independent of a transceiver of the mobile device used to perform wireless mobile communication network communication,
based on the application identification, determining whether a security function is required for processing the data message;
in response to the determination that the received data message requires a security function, determining by using the application identification whether filtering of the received data message is required;
in response to a determination that filtering of the received data message is required, evaluating the application identification included in the received data message against a filter list including application identifications; and
based on the results of the evaluation, transmitting the data message to a secure element of the mobile device.

18. A non-transitory machine-readable medium according to claim 17, wherein the determination whether filtering is required, comprises:
(a) establishing said that one or more filter lists is to be applied to the data message based on operational states of the mobile device.

* * * * *